United States Patent [19]

Cobden et al.

[11] Patent Number: 5,062,369
[45] Date of Patent: Nov. 5, 1991

[54] FRAME STRUCTURE

[75] Inventors: Ronald C. Cobden, Pinner; Alan J. Shiels, Hazlemere, both of Great Britain

[73] Assignee: British Alcan Aluminium PLC, Buckinghamshire, England

[21] Appl. No.: 543,777

[22] PCT Filed: Oct. 20, 1989

[86] PCT No.: PCT/GB89/01264
§ 371 Date: Jul. 17, 1990
§ 102(e) Date: Jul. 17, 1990

[87] PCT Pub. No.: WO90/04534
PCT Pub. Date: May 3, 1990

[30] Foreign Application Priority Data

Oct. 21, 1988 [GB] United Kingdom ............... 8824765

[51] Int. Cl.$^5$ .................. B62D 21/12; B61D 17/00
[52] U.S. Cl. .................. 105/396; 105/413; 52/729; 280/781; 296/204
[58] Field of Search ............ 105/396, 402, 403, 413, 105/415, 418, 419, 414, 422; 52/729, 731; 296/182, 204; 280/785, 781, 790

[56] References Cited

U.S. PATENT DOCUMENTS 4,958,844  9/1990  Hancock .................. 105/414 X

FOREIGN PATENT DOCUMENTS 0234800 10/1987 European Pat. Off. .
2062421  6/1971 France .
2597056 10/1987 France .
739350 10/1955 United Kingdom .

Primary Examiner—Robert J. Oberleitner
Assistant Examiner—Kevin D. Rutherford
Attorney, Agent, or Firm—Browdy and Neimark

[57] ABSTRACT

A frame structure of aluminum alloy having a pair of spaced apart side rails (1) and a plurality of spaced apart cross-members (2) each comprising a central tubular formation and extending between the side rails, characterized in that at least over a major part of its length each side rail (1) comprises at least three hollow extrusions (4-6) welded together at positions of low stress and has more than two longitudinally extending re-entrant formations opening inwardly thereof at selected low stress locations thereon to receive the heads of bolts and in that an end plate formation (3) is welded to each end of the tubular formations, the bolts engaging through apertures in the associated end plates (3) to removably secure together the side rails (1) and the cross-members (2) only by the bolts at any desired location along the major part of the length of each side rail (1).

10 Claims, 3 Drawing Sheets

FRAME STRUCTURE

This invention relates to a frame structure which is particularly although not exclusively suitable for use as the chassis frame of a road or rail vehicle.

Conventionally such chassis frames had side rails of -I-section beams fabricated by welding with welded web stiffeners at locations subject to high loading. In view of the high stresses to which the flanges of the beams may be subjected it is undesirable to weld other members on to or near these flanges. Such side rails also present design limitations partly because reinforcement is necessary at any position to which another structural member is joined and partly because both bending and changing the shape of the rails is difficult.

In our prior U.K. patent application 8603235 we describe a vehicle chassis of aluminium alloy having two spaced apart side rails each comprising at least two hollow extrusions stuck together with at least one of the rails having an outwardly facing extruded formation for receiving fasteners to be secured to other, non-structural, members disposed outwardly of the side rails. These formations are unrelated to the load bearing function of the vehicle chassis. The rails are described as having brackets bonded to the inner faces thereof at intervals therealong to be bolted to box formations extending between the side rails. Thus the rails do not need extra reinforcement at highly stressed locations such as the respective upper and lower surfaces of the hollow extrusions and the box formations constituting structural parts of the chassis are secured to the side rails in a manner that does not adversely affect the stress characteristics of the side rails.

We have now found that an improved frame structure can be provided having side rails each comprising at least three hollow extrusions and structural cross-members of an aluminium alloy that can be assembled wholly by the use of bolts so that it can readily be dismantled for replacing parts.

According to the present invention there is provided a frame structure of aluminium alloy having a pair of spaced apart side rails and a plurality of spaced apart cross-members each comprising a central tubular formation and extending between the side rails, characterised in that at least over a major part of its length each side rail comprises at least three hollow extrusions welded together at positions of low stress and has more than two longitudinally extending re-entrant formations opening inwardly thereof at selected low stress locations thereon to receive the heads of bolts and in that an end plate formation is welded to each end of the tubular formations, said bolts engaging through apertures in the associated end plates to removably secure together the side rails and the cross-members only by said bolts at any desired location along said major part of the length of each side rail.

The above and other aspects of the invention will now be described by way of example with reference to the accompanying drawings in which.

Figure 1:
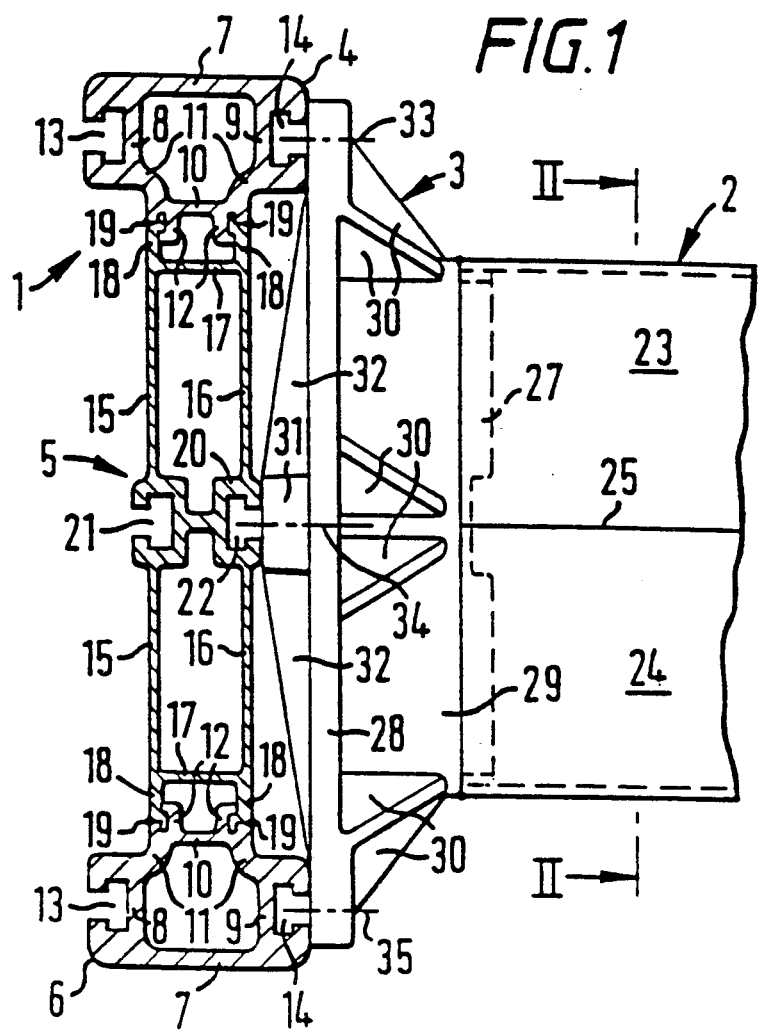
FIG. 1 shows a section through a side rail with a cross-member bolted thereto.
Figure 2:
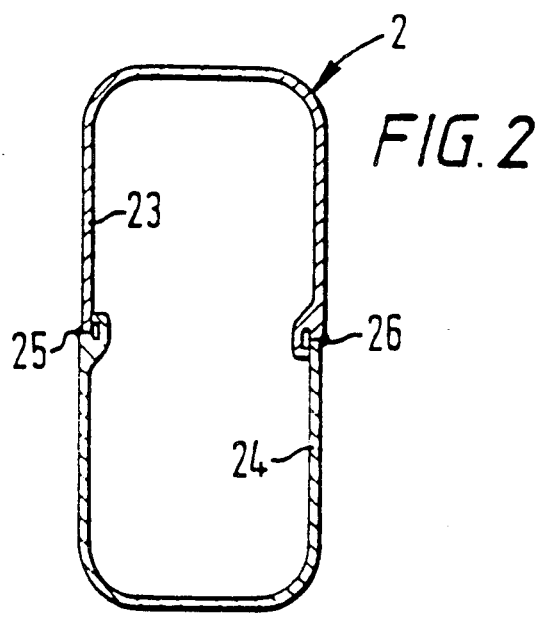
FIG. 2 is a section on the line II—II of FIG. 1.

Referring to FIGS. 1 and 2 of the drawings a chassis frame comprises a side rail 1 joined to a cross-member 2 via an end plate 3. The side rail is formed of three hollow aluminium alloy extrusions 4, 5 and 6. The outer extrusions 4 and 6 are identical and are welded to opposed ends of the central extrusion 5.

The extrusions 4 and 6 each have an outer flange 7, side wall 8 and 9 and an inner wall 10 joined to the side walls by inclined parts 11. The edges of the inner wall 11 are provided with formations, indicated at 12 to facilitate welding. The side walls 8 and 9 are extended to provide continuous re-entrant slots 13 and 14.

The central extrusion 5 is of generally rectangular shape with flank walls 15 and 16 and end walls 17. The flank walls are extended at 18 and suitably shaped to cooperate with the formations 12 for the extrusions to be welded together at 19. A longitudinal boss 20 is formed centrally of the flank walls 15, 16 and has two opposed re-entrant slots 21 and 22.

It will here be understood that, in considering the side rail as a form of -I- beam the outer flanges 7 of the extrusions 4 and 5 are high stress areas when the rail is under load whereas the welds 19 and the re-entrant slots 13, 14, 21 and 22 are at positions of low stress.

As shown in FIG. 2, the cross-member 2 is a hollow tube of generally rectangular section extruded from an aluminium alloy in two identical parts 23 and 24 welded together at 25 and 26. Each end the tube is welded around a flange 27 of the end plate 3. The latter is an aluminium alloy casting having a flat base plate 28 supporting a central tubular portion 29 via a series of flanges 30.

The base plate 28 is formed on its side remote from the tubular portion 29 with a transverse boss 31 supported by webs 32. The boss 31 has a depth such that when the base plate is bridged across the extrusions 4 and 6 the boss contacts the boss 20. Six holes are formed around the periphery of the base plate, three of them being at the positions indicated by the chain lines 33, 34 and 35. The cast end plate 3 is secured to the side rail 1 by bolts (not shown) the heads of which are held captive in the re-entrant slots 14 and 22.

Thus a chassis frame may be constructed with any number of cross-members 2 secured between a pair of side rails 1 solely by bolting. The chassis frame may therefore readily be dismantled to repair damage. More important however is that the choice of position for the cross-members does not depend on any special reinforcing of the side members since none of the bolts is located at a high stress region of the side rails. This arrangement permits great flexibility of design.

Figure 3:
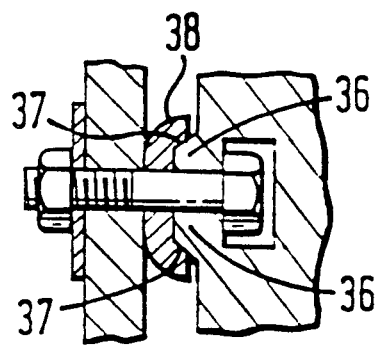
FIG. 3 shows in section, a modified fastening.

FIG. 3 shows a modification in which the lips 36 of the slots 14 and 22 are extended outwardly with chamfered shoulders 37. Elongated washers 38 are provided beneath the base plate 28 to clamp over the shoulders and preserve the shape of the slots under high load conditions.

Figure 4:
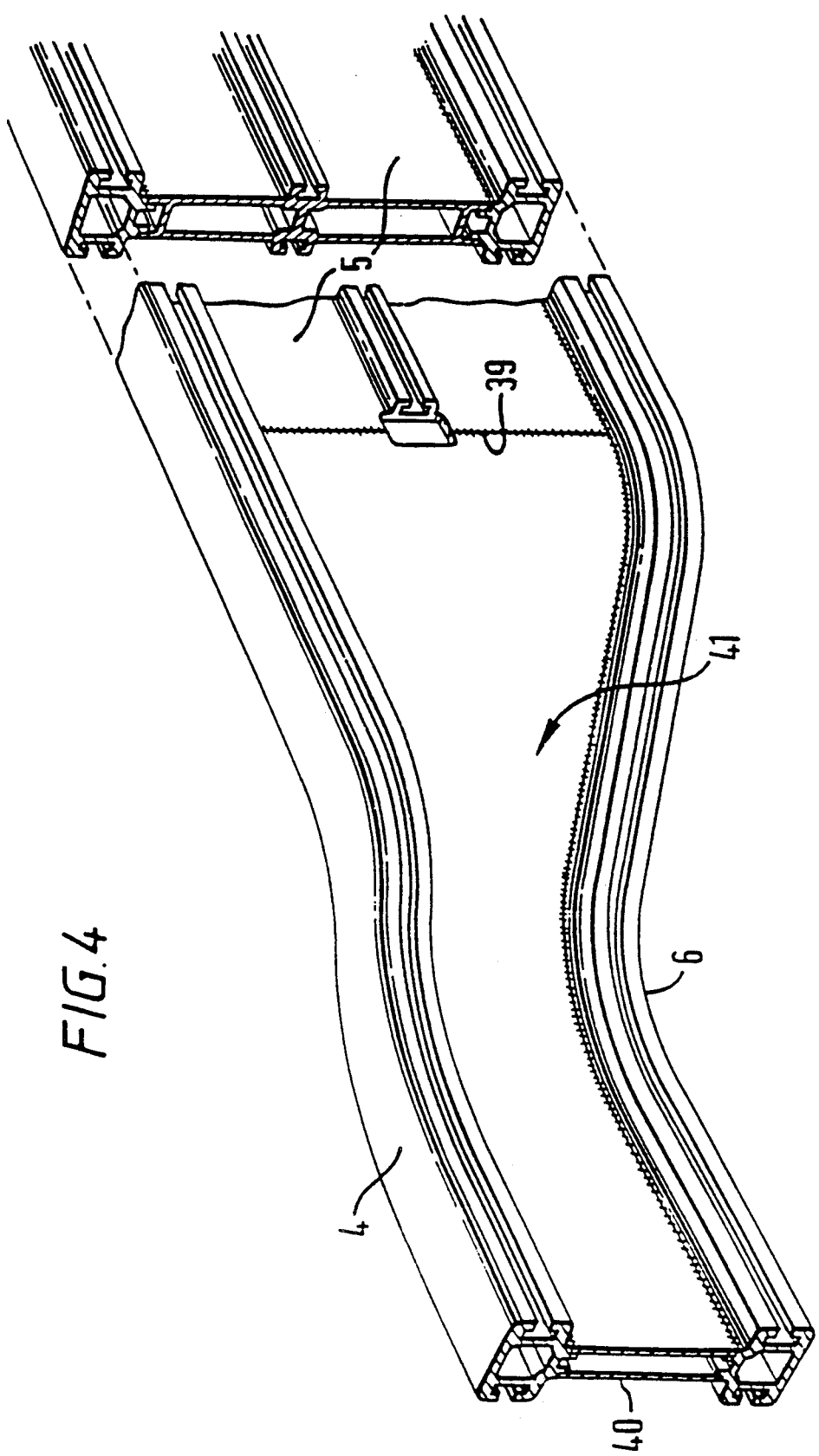
FIG. 4 shows in perspective, one end of a shaped side rail.

FIG. 4 shows how the side rails 1 may be shaped, for example in a road trailer to provide low loading heights to the main part of a trailer or, over a bogie mounting for a railway wagon frame. The central extrusion 5 is terminated at 39, the extrusions 4 and 6 are bent to the desired shape and are joined by shaped plates 40 and 41 welded thereto.

Figure 5:
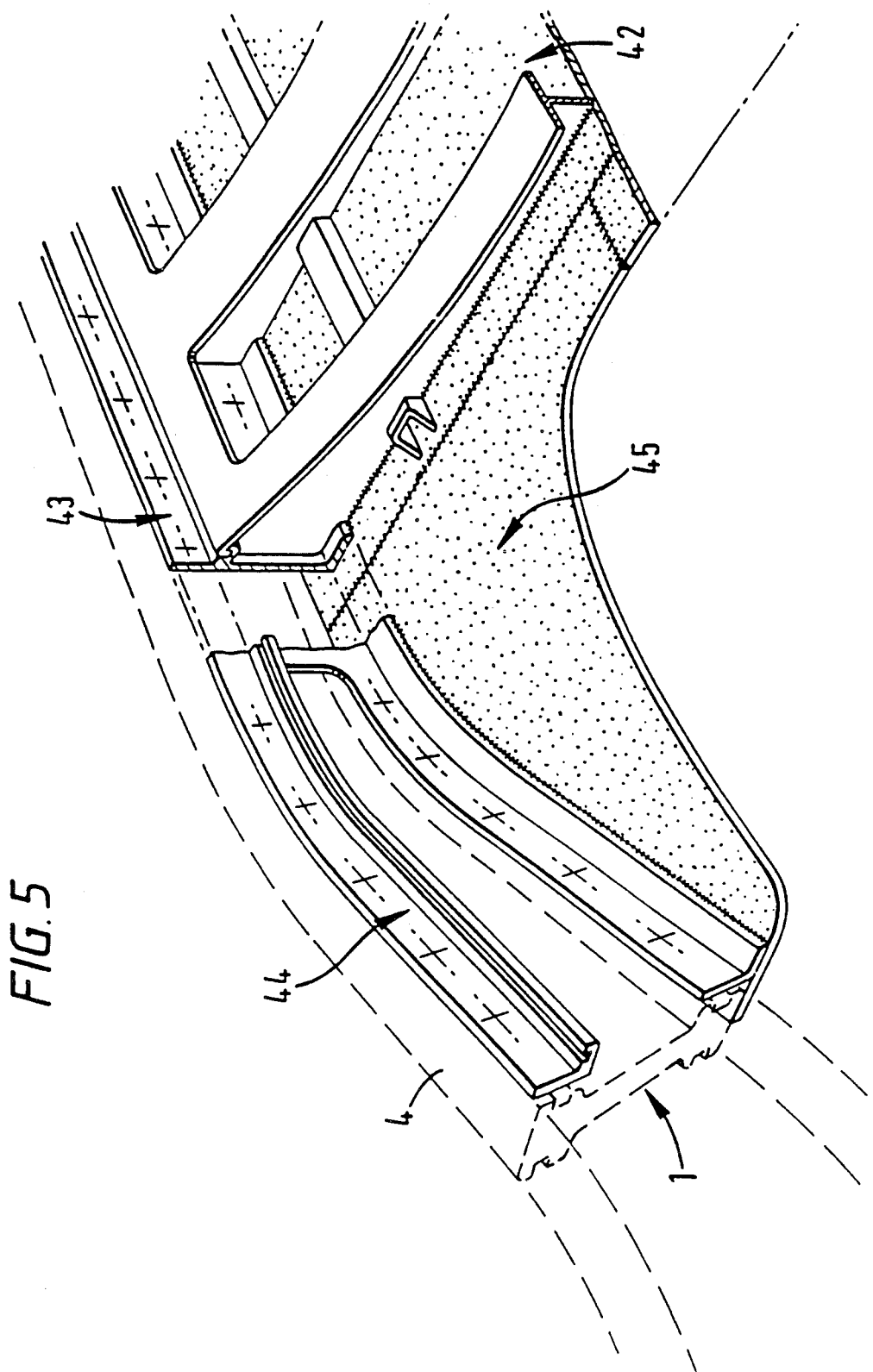
FIG. 5 is a perspective view with parts cut away of a skid-plate sub assembly.

FIG. 5 shows part of the skid-plate end of a road trailer chassis frame. Such skid plate is typically reduced in height and this tends to reduce the strength of the frame. Accordingly a reinforced skid plate sub assembly 42 has side plates 43 bolted to the side rails. These side plates are extended at 44 rearwardly of the shaped side rails until a position of lower frame stress is reached and a gusset 45 is connected between them to provide additional strength.

What is claimed is:

1. A frame structure of aluminium alloy having a pair of spaced apart side rails and a plurality of spaced apart cross-members each comprising a central tubular portion and extending between the side rails, characterised in that at least over a major part of its length each side rail comprises at least three hollow extrusions welded together at positions of low stress and has more than two longitudinally extending re-entrant, slots opening inwardly thereof at selected low stress locations thereon to receive the heads of bolts and in that an end plate formation is welded to each end of the tubular formations, said bolts engaging through apertures in the associated end plates to removably secure together the side rails and the cross-members only by said bolts at any desired location along said major part of the length of each side rail.

2. A structure according to claim 1 in which outer extrusions are identical and are welded to opposed ends of a central extrusion the outer extrusions being formed with first and second continuous re-entrant slots on their inner surfaces and the central extrusion being formed with a third continuous re-entrant slot on an inner wall thereof.

3. A structure according to claim 2 in which the central extrusion is formed centrally with a boss extending between the inner wall and an outer wall thereof and the inner wall of the boss is formed with said third slot.

4. A structure according to claim 3 in which the plane containing the first and second slots is displaced outwardly of the plane containing the third slot.

5. A structure according to claim 2 in which at least one end of the side rails has the central extrusion terminated and the outer extrusions are continued, bent to a desired shape and joined by at least one shaped plate welded thereto.

6. A structure according to claim 5 in which the side rails at said one end are joined by a skid-plate sub assembly having side plates bolted thereto, the side plates extending along the structure to a position of comparatively low frame stress and are joined by a gusset connected between them.

7. A structure according to claim 1 in which each end plate formation is a casting formed with a plurality of holes in a single plane to register with said first and second re-entrant slots and at least one further hole in a different plane to register with the third re-entrant slot.

8. A structure according to claim 1 in which each central tubular, portion is formed of two identical extrusions welded together.

9. A structure according to claim 1 in which the lips of the re-entrant slots are extended outwardly of the slots and have chamfered shoulders; elongated washers being provided in association with fixing bolts externally of the slots to preserve the shape of the slots under high load conditions.

10. A vehicle chassis incorporating a frame structure according to claim 1.

* * * * *